(12) United States Patent
Michaud

(10) Patent No.: US 10,459,852 B1
(45) Date of Patent: Oct. 29, 2019

(54) MEMORY UTILIZATION ANALYSIS FOR MEMORY MANAGEMENT SYSTEMS

(71) Applicant: EMC IP Holding Company LLC, Hopkinton, MA (US)

(72) Inventor: Adrian Michaud, Carlisle, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 50 days.

(21) Appl. No.: 15/661,598

(22) Filed: Jul. 27, 2017

(51) Int. Cl.
  *G06F 13/16* (2006.01)
  *G06F 12/1027* (2016.01)
  *G06F 12/1009* (2016.01)
  *G06F 12/121* (2016.01)

(52) U.S. Cl.
  CPC ........ *G06F 13/161* (2013.01); *G06F 12/1009* (2013.01); *G06F 12/1027* (2013.01); *G06F 12/121* (2013.01); *G06F 2212/502* (2013.01); *G06F 2212/621* (2013.01); *G06F 2212/65* (2013.01); *G06F 2212/68* (2013.01)

(58) Field of Classification Search
  None
  See application file for complete search history.

(56) References Cited

U.S. PATENT DOCUMENTS

| | | | | |
|---|---|---|---|---|
| 2009/0182976 | A1* | 7/2009 | Agesen | G06F 12/1009 711/207 |
| 2011/0156799 | A1* | 6/2011 | Zanardi | G01K 3/005 327/512 |
| 2016/0378655 | A1* | 12/2016 | Blagodurov | G06F 12/0811 711/122 |
| 2018/0260323 | A1* | 9/2018 | John | G06F 12/08 |

\* cited by examiner

Primary Examiner — Charles Rones
Assistant Examiner — Jonah C Krieger
(74) Attorney, Agent, or Firm — Ryan, Mason & Lewis, LLP

(57) ABSTRACT

Memory management systems and methods are provided in which n-bit translation counters are included within page table entry (PTE) data structures to count of number of times that translations are performed using the PTEs of pages. For example, a method for managing memory includes: receiving a virtual address from an executing process, wherein the virtual address references a virtual page frame number (VPFN) in a virtual address space associated with the executing process; accessing a PTE for translating the VPFN to a page frame number (PFN) in physical memory; incrementing a n-bit translation counter within the accessed PTE in response to the translating; and accessing a memory location within the PFN in the physical memory, which corresponds to the virtual address.

20 Claims, 5 Drawing Sheets

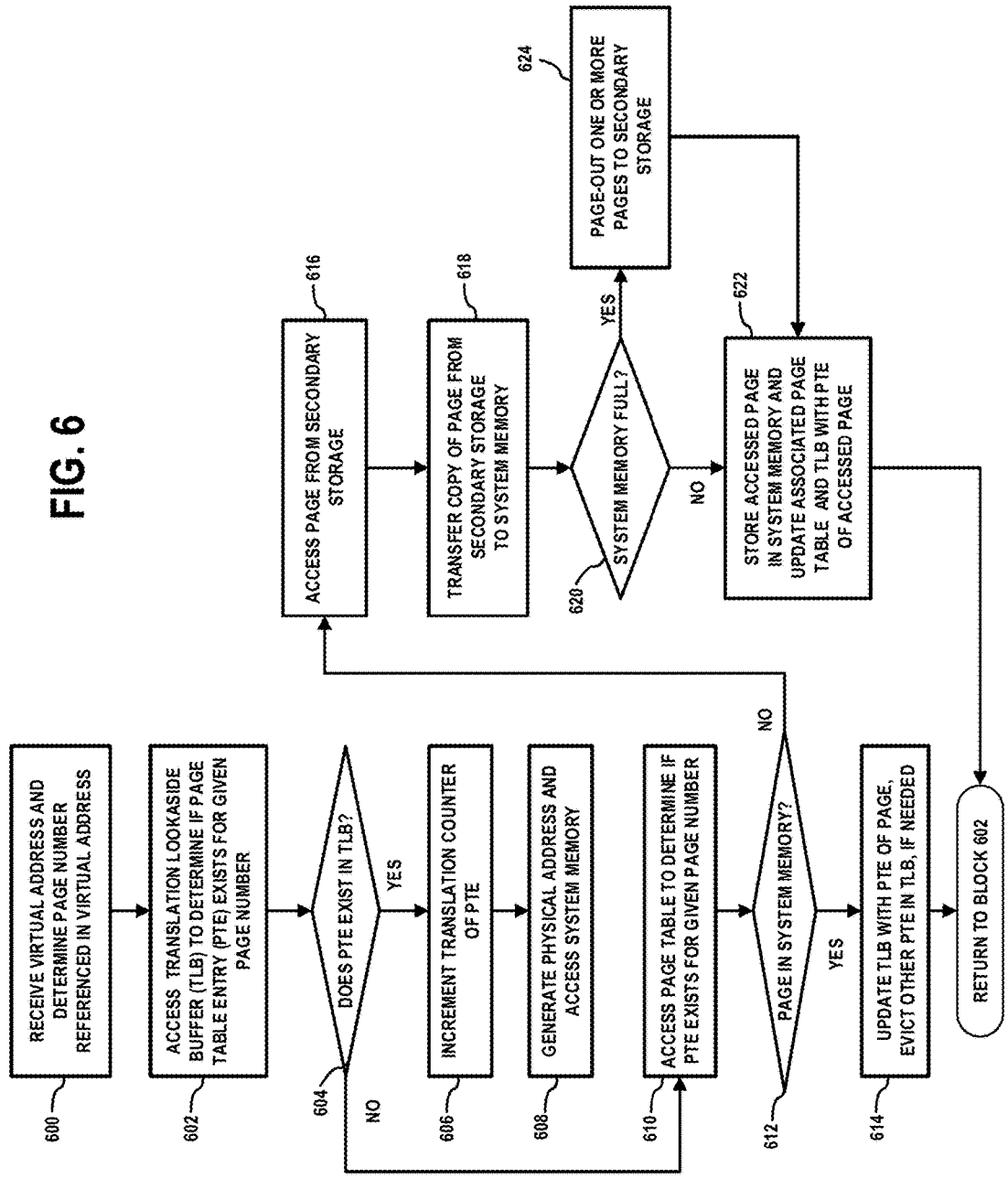

MEMORY UTILIZATION ANALYSIS FOR MEMORY MANAGEMENT SYSTEMS

FIELD

The field relates generally to memory management techniques and, in particular, to memory utilization analysis techniques for memory management systems.

BACKGROUND

Currently, in-memory management systems are being designed to rely on primary data residency in system memory (e.g., volatile byte-addressable random access memory (RAM)) and primary data persistence in low-latency non-volatile, byte-addressable memory to achieve lower access latencies for primary data used to execute various types of applications (e.g., database application). In-memory management systems typically implement virtual memory management schemes in which virtual memory addresses that are referenced by an application or process are mapped into physical addresses in memory. A memory management unit (MMU) allows a processor to efficiently manage physical memory by creating one or more sparse virtual address spaces that can translate to sparse physical addresses. A MMU divides virtual and physical memory into pages, where pages can range in size from 4 Kbyte to larger size pages (e.g., megabyte or gigabyte). An MMU will utilize page table entries (PTEs), which are stored in page tables, to perform virtual-to-physical address translation operations, and utilize control and flag information within the PTEs to determine caching, permissions, access rights, and other information for individual pages within a virtual address space.

With conventional virtual memory management schemes, it is difficult and expensive for an operating system or hypervisor to efficiently measure memory utilization for pages that are mapped into a translation lookaside buffer (TLB). For example, a conventional PTE data structure includes a single "accessed" bit which provides a flag that is used by the operating system to mark a given page as having been accessed when, for example, the PTE is mapped into a TLB. However, the single "accessed" bit does not provide specific information regarding the frequency of page utilization, and it would be very inefficient for the operating system or hypervisor to continually scan and clear/reset the "accessed" control bits in PTEs of pages for purposes of measuring memory utilization.

SUMMARY

Illustrative embodiments of the invention generally include memory management systems and methods in which n-bit translation counters are included within PTE data structures to count a number of times that translations are performed using the PTEs of pages. For example, one embodiment includes a method for managing memory which comprises: receiving a virtual address from an executing process, wherein the virtual address references a virtual page frame number (VPFN) in a virtual address space associated with the executing process; accessing a PTE for translating the VPFN to a page frame number (PFN) in physical memory; incrementing a n-bit translation counter within the accessed PTE in response to the translating; and accessing a memory location within the PFN in the physical memory, which corresponds to the virtual address.

Other embodiments of the invention include, without limitation, apparatus and articles of manufacture comprising processor-readable storage media.

BRIEF DESCRIPTION OF THE DRAWINGS

FIG. 6 is a flow diagram of a method for managing memory using PTEs with translation counters, according to an embodiment of the invention.

DETAILED DESCRIPTION

Embodiments of the invention will be described herein with reference to memory management systems and methods in which n-bit translation counters are included within PTE data structures of pages to count the number of times that pages are accessed. For example, as explained in further detail below, the n-bit translation counter within a given PTE is used by a MMU to count a number of times that a virtual address-to-physical address translation is performed using the given PTE. The count information that is captured using the n-bit translation counters within the PTEs of pages provides operating systems or hypervisors the ability to more accurately measure memory utilization for purposes of, e.g., (i) implementing a TLB replacement policy to select TLB entries for eviction from a TLB, (ii) implementing a page replacement policy to select pages to be paged-out from physical memory, and/or (iii) determining which level of memory in a tiered memory framework comprising multiple tier levels of physical memory, to store pages based on the translation count values within the PTEs of the pages, etc.

Figure 1:
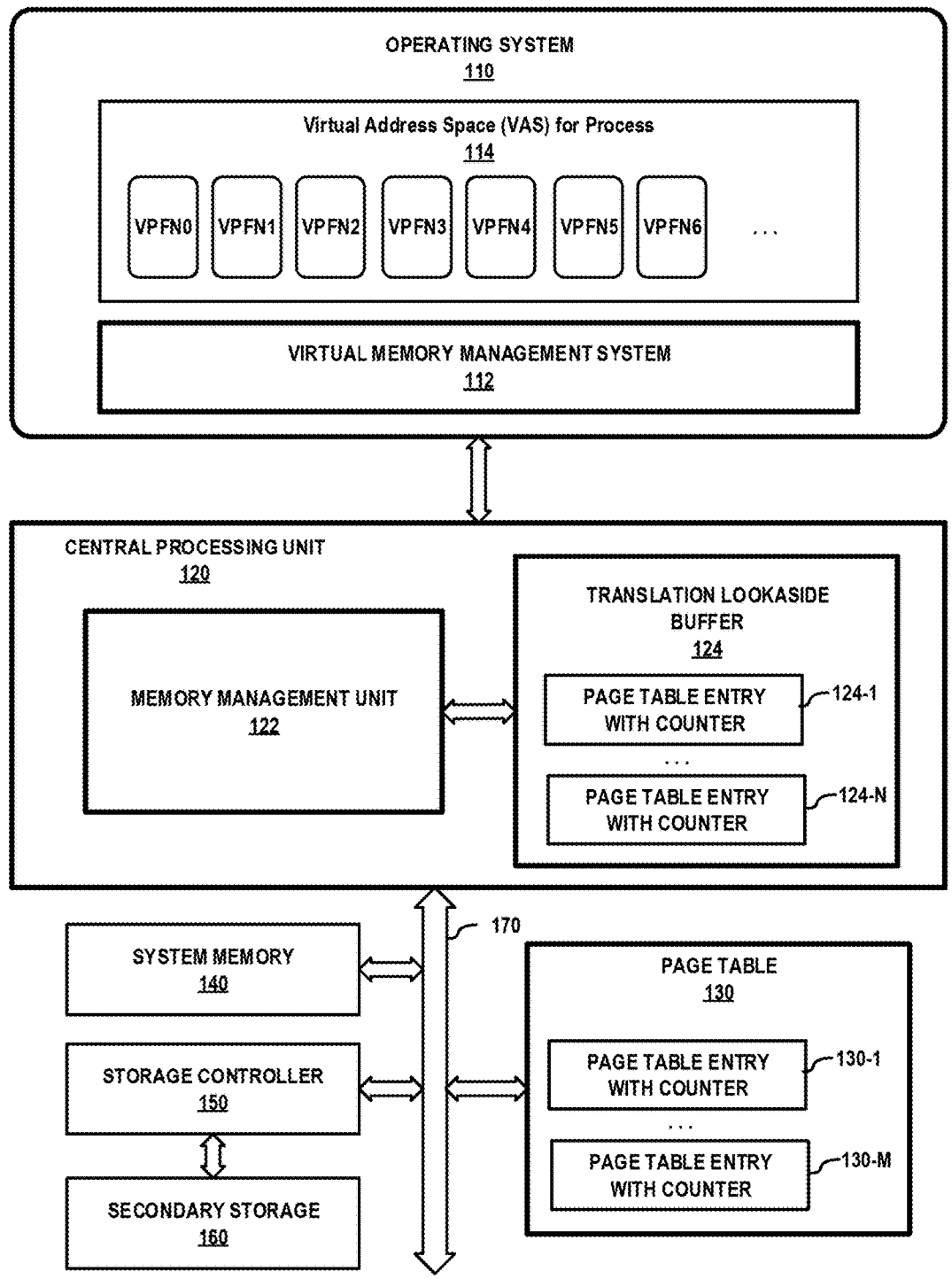
FIG. 1 is a high-level schematic illustration of a memory management system according to an embodiment of the invention.

FIG. 1 is a high-level schematic illustration of a memory management system 100 according to an embodiment of the invention. The memory management system 100 comprises an operating system 110 having kernel functions and processes that are executed by a central processing unit (CPU) 120. For example, the operating system 110 comprises a virtual memory management system 112 which manages a virtual address space (VAS) 114 of a given process. The CPU 120 comprises a memory management unit (MMU) 122 and a translation lookaside buffer (TLB) 124. The memory management system 100 further comprises cached page tables 130, system memory 140, a storage controller 150, and secondary storage 160, which are accessible by the CPU 120 over a system bus 170. As further shown in FIG. 1, the TLB 124 comprises a plurality (N) of page table entries 124-1~124-N, and the page table 130 comprises a plurality (M) of page table entries 130-1~130-M. As explained in further detail below, each page table entry comprises an n-bit translation counter that is used by the MMU 122 to maintain a count of the number of times that a given page associated with a given PTE has been accessed.

It is to be understood that FIG. 1 is meant to generically represent a memory management system that can be implemented for various applications and in various computing platforms (e.g., data center, cloud computing platform, etc.) comprising distributed virtual infrastructure and those not comprising virtual infrastructure. The memory management system 100 may be implemented on a computer server including, but not limited to, an application server which is configured to host and execute one or more user applications (e.g., database applications), or a storage server which is configured to host and execute one more applications to support data storage services. It is to be understood that the term "application" as used herein refers to any type of software application or program having program code that is executable by computer processors to perform various operations and provide various services. In addition, the terms "application process" and "process" refer to an instance of an application or block of program code that is being executed on a host computing system.

In the context of virtual memory management, the virtual memory management system 112 of the operating system 110 (or hypervisor) is configured to map virtual addresses used by an application or process into physical addresses in system memory 140. In a virtual memory system, the memory addresses that are referenced by a given process are the virtual addresses within a VAS assigned to the given process. During program execution, the virtual addresses are converted into physical addresses by the MMU 122 based on information that is maintained in "page tables" (e.g., page table 130) by the operating system. To facilitate this conversion, virtual and physical memory are divided into equal-sized "pages" (e.g., 4 Kbyte pages or 8 Kbyte pages), wherein each page in virtual memory is assigned a unique number which is referred to herein as a virtual page frame number (VPFN), and wherein each page in physical memory is assigned a unique number which is referred to herein as a page frame number (PFN). In particular, a VAS is partitioned into equal-sized virtual pages, wherein each virtual page comprises a fixed-length block of contiguous virtual memory addresses, and wherein each virtual page is described by a single PTE in a page table. A virtual address within a VAS is represented at least in part by a VPFN and an offset. Similarly, a physical memory is partitioned into equal-sized page frames (with page frame size equal to the size of the virtual pages), wherein each page frame comprises a fixed-length block of contiguous physical memory addresses into which virtual pages are mapped by the operating system.

With virtual memory management, the operating system establishes a virtual address space for a given application process, which comprises a range of virtual addresses that the OS makes available to the application or process. For example, FIG. 1 illustrates the VAS 114 for a given process, which is divided into a plurality of equal-sized pages that are assigned unique VPFNs. For ease of illustration, only seven (7) VPFNs are shown in a beginning portion of the VAS 114, wherein the pages are assigned respective page virtual frame numbers VPFN0, VPFN1, VPFN2, VPFN3, VPFN4, VPFN5, VPFN6, and wherein VPFN0 represents the initial page (i.e., initial block of virtual addresses) at the beginning of the VAS 114. The operating system assigns a separate VAS for each application or process in the system, wherein the virtual address spaces of different applications are logically separate from each other to prevent one application from accessing a virtual address in the VAS of another application. In certain applications, the operating system allows different processes to share virtual memory to implement, for example, an IPC (inter process communication) mechanism that allows multiple process to exchange information using a common memory.

Furthermore, in a virtual memory system, memory mapping methods are utilized to map image and data files of a process (which are stored on disk, for example) into the VAS of the process. In particular, when a process initiates the execution of an executable image, the contents of the executable image, as well as any associated shared libraries and/or data are mapped (or linked) into virtual pages of the VAS of the process, but not necessarily stored into the system memory 140. The OS determines which portions of the process's VAS are mapped into the system memory 140 at any one time. Once the executable image has been memory mapped into the VAS of the process, the image starts to execute. As the running process accesses regions of virtual memory that are not in physical system memory (resulting in page faults), the corresponding memory mapped pages on the secondary storage 160 (e.g., hard disk drive (HDD)) are accessed and stored into free page frames in the physical system memory 140. The transfer of pages between the system memory 140 and the secondary storage 160, such as a hard disk drive, is referred to as demand paging or swapping.

The MMU 122 comprises a hardware unit that is configured to translate a virtual memory addresses (of a given process) to a physical address using information contained in the TLB 124 and the page table 130 associated with the given process. In the example embodiment of FIG. 1, the MMU 122 is implemented as part of the CPU 120, but the MMU 122 can be a separate integrated circuit chip that communicates with the CPU 120. The page table 130 comprises one PTE per page (for a given process) to map virtual page numbers to physical page numbers in the system memory 140. The page table 130 can be stored in a memory that is separate from the system memory 140 (e.g. a cache of the CPU 120, registers of the MMU 122, etc.), or stored in the system memory 140 (e.g., dynamic random access memory (DRAM)). The MMU 122 comprises registers with pointers to memory locations where the page table 130 is stored, and the MMU 122 can access the page table 130 directly.

The TLB 124 comprises a hardware cache or register which stores the PTEs of recently accessed pages. The TLB 124 stores recent translations of virtual memory to physical memory. In the example embodiment of FIG. 1, the TLB 124 is implemented using a cache or register of the CPU 120, although the TLB may be implemented as part of the MMU 122 when the MMU 122 is implemented as a separate integrated circuit chip. In one embodiment, the TLB 124 is implemented as a fully associative cache which allows the MMU 122 to search all entries in the TLB 124 in parallel, wherein the cache tags are VPFNs, and the cache values are PTEs. For example, the TLB 124 can be implemented as a type of content-addressable memory (CAM) or associated cache of PTEs, where the search key comprises a virtual address to translate, and the result is the physical frame address.

Figure 2:
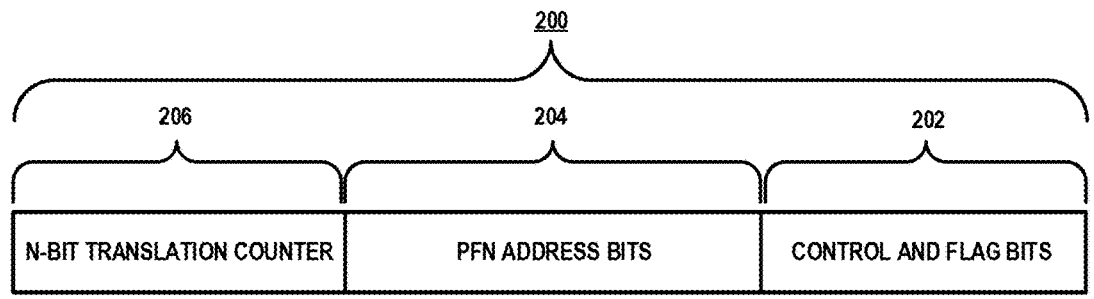
FIG. 2 schematically illustrates a format of a PTE data structure comprising a translation counter according to an embodiment of the invention.

FIG. 2 schematically illustrates a format of a PTE data structure comprising a translation counter according to an embodiment of the invention. The PTE data structure 200 comprises a block of control and flag bits 202, a block of PFN address bits 204, and an n-bit translation counter 206. The block of control and flag bits 202 of the PTE data structure 200 contains various types of access control information, which is processor specific. The PFN address bits 204 specify an address of the PFN in memory, which corresponds to the VPFN associated with the given PTE. The number of bits used for block 204 will depend on the page size of the given virtual memory framework. As noted above, the n-bit translation counter 206 is used by the MMU 122 to count a number of times that a virtual address-to-physical address translation is performed using the given PTE. The n-bit translation counter 206 can be readily implemented within the PTE data structure of existing VM architectures using, for example, "reserved bits" of the PTE data structures. The size (n) of the translation counter 206 is architecture/implementation specific. For example, in one embodiment, n=10.

The block of control and flag bits 202 can include information such as: (i) a "Present" or "Valid" flag (single bit) which specifies whether the given page is present in physical memory or not, or whether the VPFN for the given PTE is mapped to a physical PFN; (ii) a R/W flag (single bit) which specifies whether the given page is read-only or writable; (iii) a (U/S) User mode/Supervisor mode flag (single bit) which indicates whether the given page is kernel (supervisor) mode or user mode (which cannot read or write supervisor pages); (iv) a PWT flag (single bit) which specifies whether or not the give page is enabled for write-through caching; and (v) a "dirty" flag (single bit) which specifies whether the given page has or has not been written to (e.g., if dirty bit is set, this indicates that the page needs to be written out to a swap file).

In conventional PTE data structures, the control and flag bits 202 would also include an "accessed" flag (single bit) which specifies if the page associated with the PTE has been the target of a load/store (i.e., to indicate whether or not the page has been accessed). Once the "accessed" bit is set, it only provides an indication as to whether the given page has been accessed at least one time, but does not provide any indication as to the number of times (or frequency at which) the given page has been accessed during a given period. Once the "accessed" bit is set, an operating system or hypervisor would need to constantly check and clear/invalidate the "accessed" bit for every PTE at high frequency in order to accurately measure individual page usage. This is an expensive operation because when the "accessed" bit for a given PTE is cleared, the system would also need to atomically invalidate the PTE entry in the TLB at the same time to maintain consistency between the TLB and page tables. For this reason, operating systems and hypervisors rarely attempt to characterize memory usage for mapped in pages.

In accordance with embodiments of the invention, the n-bit translation counter 206 within the PTE 200 is utilized to count a number of times that a given page is accessed/referenced, thereby providing an efficient means for measuring memory utilization for the given page. In particular, in one embodiment of the invention, the n-bit translation counter 206 within a PTE for a given page will be incremented by one when a translation (virtual address-to-physical address) is performed by the MMU 122 using the TLB 124 (i.e., TLB hit) for the given page. To determine memory utilization, the operating system or hypervisor can check the count values of the PTEs at a low frequency (e.g., every 1 second) to determine how frequently the pages are being accessed by a given process.

In a conventional scheme, a TLB will store a given PTE for as long as possible before the given PTE needs to be evicted to make room for another PTE, and the given PTE will be written back when the accessed bit or dirty bit of the given PTE in the TLB is set by the MMU. In accordance with an embodiment of the invention, a PTE with a translation counter will be written back when it is evicted from the TLB. If the translation counter of a given PTE overflows (all 1's), then counting is disabled until the operating system or hypervisor clears/resets the translation counter in the corresponding PTE that resides in a page table. The virtual management system can keep track of the counter overflow condition for a given PTE so that when the translation counter is reset and begins counting from count=0, the true memory usage information for the page associated with the given PTE will be maintained. The tracking of the overflow condition of translation counter for a given PTE is increasingly important as the number of bits (n) used for the translation counter decreases (e.g., depending on the availability of reserved bits in a PTE data structure of an existing VM scheme, which can be used to implement the translation counter).

Figure 3:
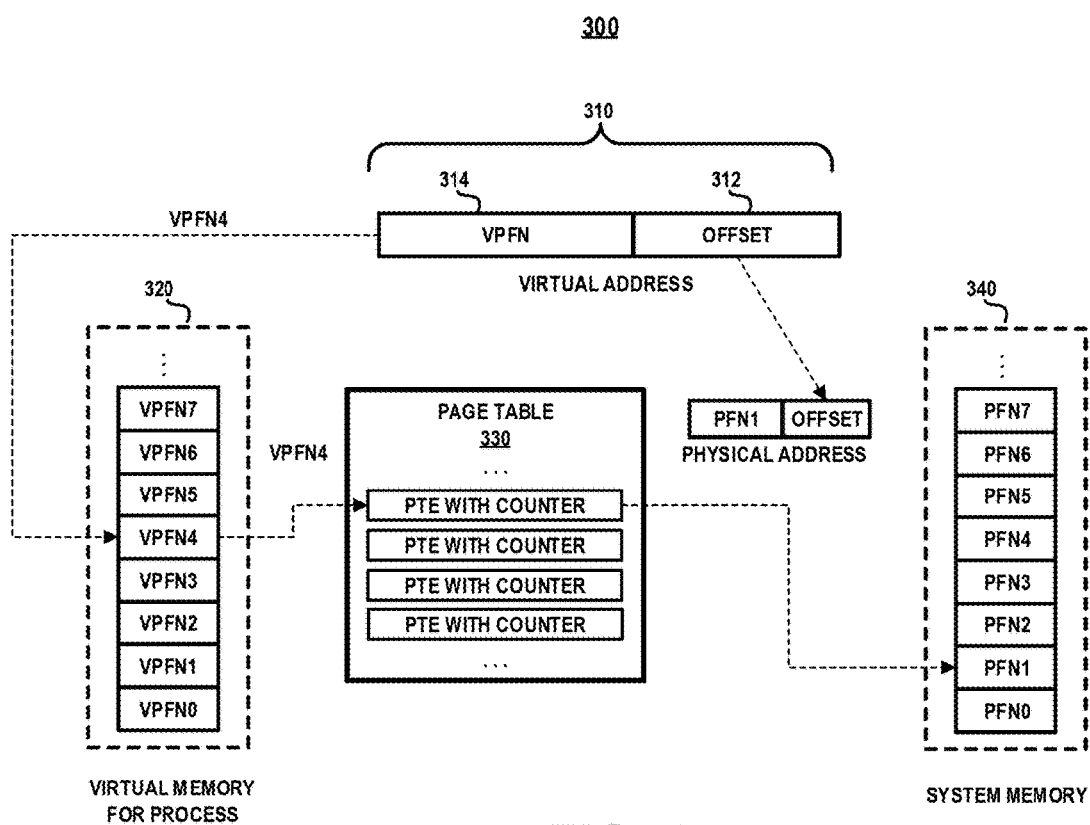
FIG. 3 schematically illustrates a single-level page table scheme which can be implemented using PTEs with translation counters according to an embodiment of the invention.

FIG. 3 schematically illustrates a single-level page table scheme which can be implemented using PTEs with translation counters according to an embodiment of the invention. In particular, FIG. 3 illustrates a single-level page hierarchy scheme 300 wherein a virtual address 310 comprises an offset 312 and a VPFN 314. FIG. 3 further illustrates a VAS 320 for a given process, a single page table 330 with a PTE entry for each virtual page in the VAS 320, and a system memory 340 (e.g., DRAM) which is logically divided into a plurality of page frames each with a unique PFN. As schematically illustrated in FIG. 3, a VPFN 314 provides an index into the page table 330 to access a corresponding PTE in the page table 330, wherein the given PTE specifies a PFN, and wherein a physical address is generated from the PFN and offset. The example embodiment of FIG. 3 shows that VPFN4 of the given process is mapped into PFN1 of the system memory 340.

Figure 4:
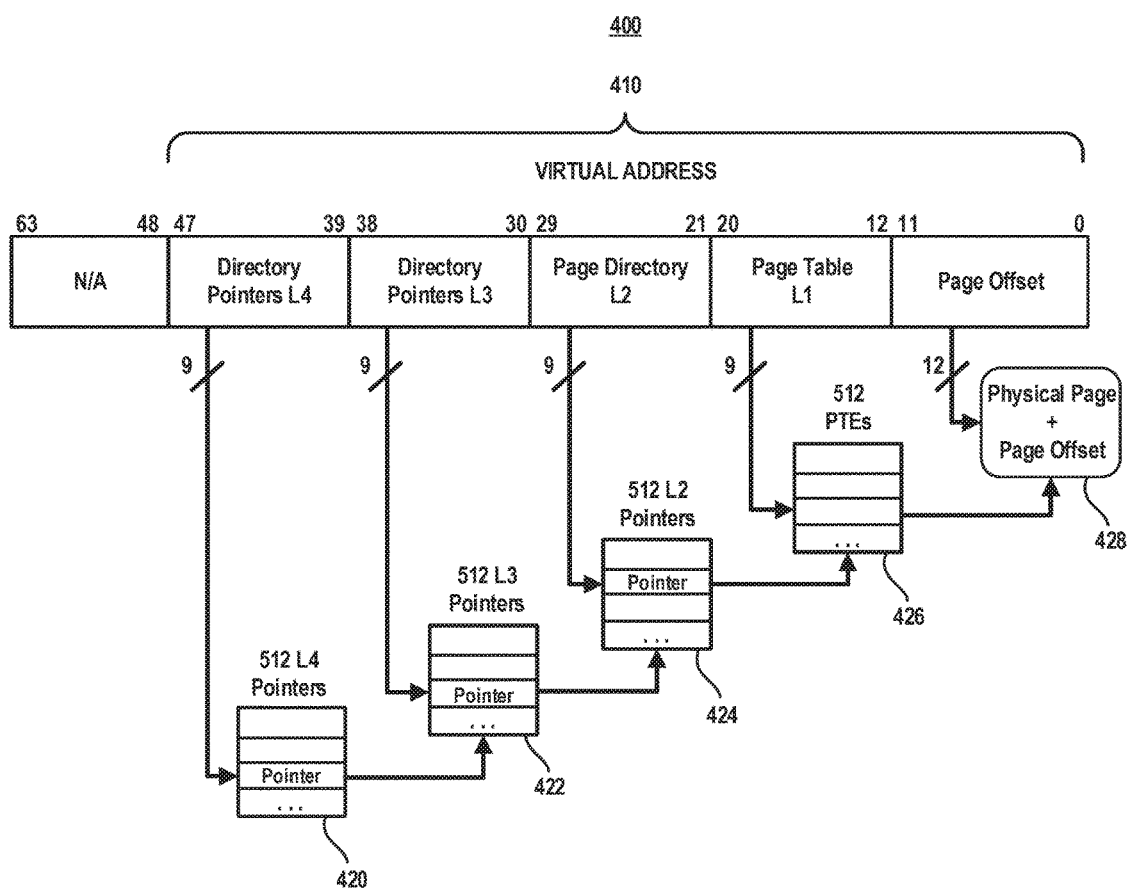
FIG. 4 schematically illustrates a multi-level page table hierarchy scheme which can be implemented using PTEs with translation counters according to an embodiment of the invention.

FIG. 4 schematically illustrates a multi-level page table hierarchy scheme which can be implemented using PTEs with translation counters according to an embodiment of the invention. An MMU typically uses a nested in-memory look up table consisting of one or more page directories and associated page tables. In particular, FIG. 4 illustrates a 4-level page hierarchy scheme 400 in a 64-bit system using a 48-bit virtual address 410 (bits 47:0). The bits (47:39) specify a page directory 420 (level 4), the bits (38:30) specify a page directory 422 (level 3), the bits (29:21) specify a page directory 424 (level 2), the bits (20:12) specify a page table 426 (level 1), and the bits (11:0) specify a page offset.

In the example embodiment of FIG. 4, each page directory 420, 422 and 424 comprises 512 page directory entries (PDEs), and the page table 426 comprises 512 PTEs. The page directories 420, 422 and 424 and page table 426 collectively provide a mapping between the virtual address 410 and a physical address 428. While the L1 page directory 424 points to the page table 426, the other page directories 420 and 422 have PDEs that point to a lower level page directory. In accordance with an embodiment of the invention, FIG. 4 schematically illustrates an example of a multi-level paging scheme 400 in which PTEs in the page table 426 include n-bit translation counters to collect count data and support various functions as discussed herein.

For purposes of illustration, embodiments of the invention will be discussed in the context of a memory centric architecture (MCA) framework in which applications executing on host computing systems are provided with additional virtual memory through a memory extension and tiering framework. The term "tiering" as used herein with regard to memory or storage refers to the placement of information on storage infrastructure resource commensurate with implementation of a defined policy. Such policies can take into account a variety of factors including, but not limited to, information utilization usage statistics (e.g., translation counter data within PTEs of pages, etc.), customer information values associated with levels of service, and any other custom tiering stratification criteria. The use of memory tiering in an MCA framework creates a bridge between traditional memory resources (e.g., volatile RAM) and storage resources (e.g., non-volatile ROM, HDD, etc.), wherein a memory tier exposes data on storage as if the data were stored in memory (i.e., data is accessed with loads and stores, instead of with I/O reads and writes).

In this regard, an MCA framework addresses an application's need for memory speed latencies and consumption of primary data residence in memory (as opposed to external storage) by maintaining in-memory data in its native memory-centric format, while moving the in-memory data to a most cost-efficient location (e.g., external memory or external storage) and maintaining full access to the in-memory data by the application. An MCA framework is implemented using various MCA library functions to efficiently manage multiple user virtual address spaces comprised of combinations of volatile memory, high throughput low latency next generation non-volatile memory technologies, NAND flash technologies connected to a host in various ways (e.g., PCI-e, SAS/SATA), host-connected disk technology, and various forms of SAN (storage area network) connected storage including both server SANs and traditional storage SANs.

Figure 5:
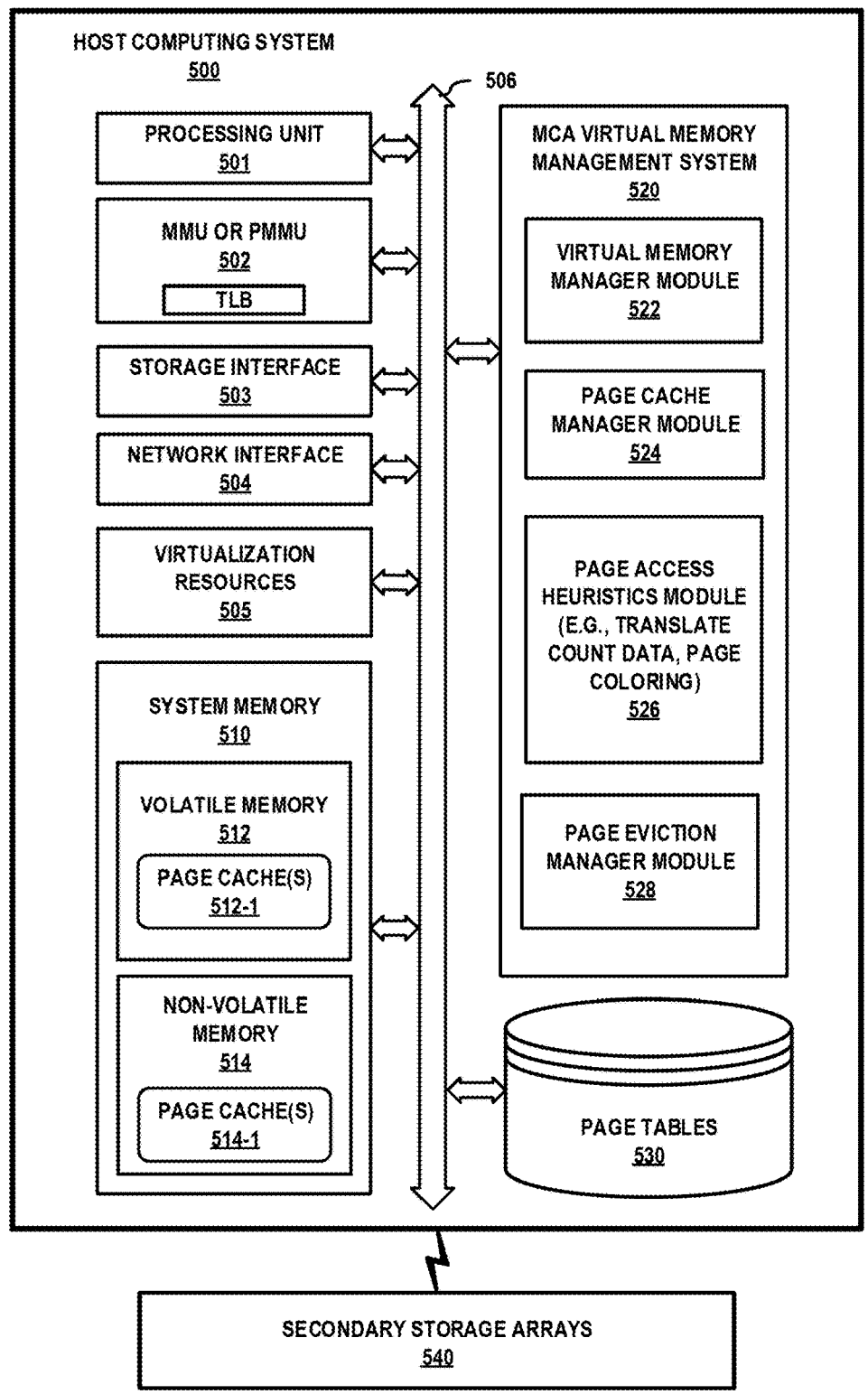
FIG. 5 schematically illustrates a computing system which implements a memory management system according to an embodiment of the invention.

FIG. 5 schematically illustrates a computing system which implements a memory management system according to an embodiment of the invention. More specifically, FIG. 5 schematically illustrates a host computing system 500 which comprises a processing unit 501, a MMU 502 (with a TLB), storage interface circuitry 503, network interface circuitry 504, virtualization resources 505, system memory 510, a virtual memory management system 520, and page tables 530 having PTEs with translation counters. The system memory 510 comprises volatile memory 512 and non-volatile memory 514. The virtual memory management system 520 comprises a virtual memory manager module 522, a page cache manager module 524, a page access heuristics module 526, and a page eviction module 528. In addition, one or more secondary storage arrays 540 (off-infrastructure non-volatile memory arrays) are accessible by the host computing system 500. The secondary storage arrays 540 may comprise storage systems including, but not limited to, a top of rack flash memory array, a solid-state drive (SSD) array, a hard disk drive (HDD) array, a network storage tier (e.g., SAN (storage area network)), a serial attached storage (SAS/SATA) tier, etc.

In one embodiment, the various system modules 522, 524, 526, and 528 of the virtual memory management system 520 comprise software modules that are persistently stored in a storage device (e.g., HDD storage). The system modules 522, 524, 526, and 528 are loaded into the system memory resources (e.g., volatile memory 512 and/or non-volatile memory 514), and executed by the processing unit 501 to perform various functions as described herein. In this regard, the system memory 510 resources and other memory or storage media as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The processing unit 501 may comprise one or more processors that are configured to process program instructions and data to execute a native operating system and applications that run on the host computing system 500. For example, the processing unit 501 may comprise one or more of a computer processor, a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc.

For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, GPUs, digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general purpose processor.

The MMU 502 (or paged memory management unit PMMU) with the TLB is illustrated as a separate hardware device that can communicate the processing unit 501 and other system components over a system bus 506 to perform paging functions as discussed herein. The storage interface circuitry 503 enables the processing unit 501 to interface and communicate with local storage and off-infrastructure storage media, using one or more standard communication and/or storage control protocols to read data from or write data to volatile and non-volatile memory/storage devices. The network interface circuitry 504 enables the host computing system 500 to interface and communicate with a network and other system components. The network interface circuitry 504 may comprise conventional transceivers of a type well known in the art (e.g., network interface cards, I/O adaptors, etc.).

The virtualization resources 505 can be instantiated to execute one or more applications or functions which are hosted by the host computing system 500. For example, in one embodiment, the virtualization resources 505 comprise virtual machines that are implemented using a hypervisor platform which executes on the host computing system 500, wherein one or more virtual machines can be instantiated to execute functions of the host computing system 500. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on physical infrastructure, e.g., CPUs and/or storage devices, of the host computing system 500, and emulates the CPUs, memory, hard disk, network and other hardware resources of a host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 505 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the host computing system 500. In yet another embodiment, containers may be used in combination with other virtualization infrastructure such as virtual machines implemented using a hypervisor, wherein Docker containers or other types of LXCs are configured to run on virtual machines in a multi-tenant environment.

The system memory 510 comprises electronic storage media such as random access memory (RAM), read-only memory (ROM), or other types of memory, in any combination. The term "memory" or "system memory" as used herein refers to volatile and/or non-volatile memory which is utilized to store application program instructions that are read and processed by the processing unit 501 to execute a native operating system and one or more applications hosted by the host computing system 500, and to temporarily store data that is utilized and/or generated by the native OS and application programs running on the host computing system 500. For example, the volatile memory 512 of the system memory 510 may be a dynamic random-access memory (e.g., DRAM) or other forms of volatile RAM. The non-volatile memory 514 may comprise a storage-class memory (SCM) that is accessible as a memory resource. For example, the non-volatile memory 514 may be a NAND Flash storage device, a SSD storage device, or other types of next generation low-latency non-volatile, byte-addressable memory devices.

In general, the memory management system 520 comprises software modules which are configured to manage virtual memory, implement paging and swapping operations, manage multiple independent page caches, and perform other functions and operations that are commonly implement by a virtual memory management system of an operating system. For example, the virtual memory manager module 522 performs functions such as allocating a VAS to a process, memory mapping/linking blocks of data and code on a secondary storage device (e.g. HDD) to virtual pages in the VAS of a process, performing paging and swapping operations to transfer pages between the system memory 510 and the secondary storage device, mapping virtual pages in a VAS to page frames in system memory through the page tables 530, using the page tables 530 to translate virtual addresses into physical addresses in system memory, resolving page faults, etc. Although the page tables 530 are shown as an individual element in FIG. 5, it is to be understood that the page tables 530 may be stored in the system memory 510 or any other suitable memory device.

With an MCA framework, a data storage system comprising the system memory 510 and the secondary storage arrays 540 can be configured to provide multiple, independent memory/storage tiers. For example, the system memory 510 of the host computing system 500 can provide a hierarchical memory tier structure wherein the volatile memory array 512 (highest level in a memory tier) may comprise a dynamic random-access memory tier (e.g., DRAM) or other forms of volatile random-access memory, and wherein the non-volatile memory array 514 comprises a second-level storage-class memory tier (such as NAND Flash or next generation non-volatile memory (NGNVM) device) that is that is accessible as a memory resource.

Furthermore, the virtual memory manager module 522 can be utilized by an application executing on the host computing system 500 to map a private virtual address space of the application to one or more application defined memory-mapped regions of memory resident on one or more of the secondary storage arrays 540. In this regard, with the MCA framework, the secondary storage arrays 540 may be configured as lower level storage class memory tiers resident on one or more data storage node, wherein the secondary storage arrays 540 (e.g., Flash memory array, SSD array, HDD array, SAN, etc.) include memory-mapped regions in which physical pages, which are mapped to virtual pages of a running application or process, can be stored and accessed using load and store operations (as opposed I/O operations) by the virtual memory management system 520. This allows the virtual memory management system 520 and/or processes running on the host computing system 500 to make page placement selections end-to-end, e.g., across the different memory/storage tiering layers (510 and 540), or within a given memory/storage tiering layer.

The page cache manager module 524 is configured to maintain one or more page caches 512-1 in regions of the volatile memory 512 (e.g., DRAM) and/or maintain one or more page caches 514-1 in regions of the non-volatile memory 514 (e.g., flash storage device). The term "page cache" as used herein (also referred to as a disk cache) is a cache of disk-based pages kept in system memory (e.g., DRAM) by the OS for faster access. In particular, pages of memory-mapped executable images and data which originate from a secondary storage device (such as a HDD) and read into system memory 510 are stored in a page cache. In one embodiment, the page cache manager module 524 allocates a single system wide page cache for use by all processes. In another embodiment, the page cache manager module 524 is configured to pre-allocate one or more system wide fixed-size page caches, wherein different processes can control which page cache to use. This results in a more predictable execution time per process because the OS does not manage a single system wide page cache between competing processes.

The page access heuristics module 526 implements methods to track memory utilization (e.g., frequency of access of pages) using, for example, the count data that is generated by the translation counters of the PTEs associated with the pages. The count data can be utilized by the page heuristics module 526 to assign page colors to pages for a given application based on the historical information of page utilization derived from the count data of PTE translation counters, and other parameters indicative of frequency of page utilization. The page access heuristics module 526 can track and collect page access patterns and assign a "page color" to a given page based on, e.g., the frequency of access of the page by a given application. Each page can be assigned one of a plurality of predefined page colors wherein the given page color can represent an access frequency value or an importance value of the cached page. For example, pages that are more frequently accessed from memory by a given application can be assigned higher temperatures (i.e., higher page color values), which can result in the pages being retained longer within a page cache (e.g., 512-1 or 514-1) and/or being placed in memory-mapped regions of lower latency tiers of an SCM hierarchy defined within the secondary storage arrays 540. Likewise, pages with lower temperatures (i.e., lower page color values) can face demotion to lower tiers or cache eviction. In this regard, the virtual memory manager module 522 can utilize the information aggregated by the page access heuristics module 526 to determine which level of memory in a tiered memory framework comprising multiple tier levels of physical memory, to store pages based on the translation count values within the PTEs of the pages, etc.

The page eviction manager module 528 can utilize the information (e.g., translation count values within the PTEs of the pages) collected by the page access heuristics module 526 to implement and otherwise provide policies to support page replacement, page eviction, and/or TLB replacement functions. For example, the count information that is captured using the n-bit translation counters within the PTEs of pages provides operating systems or hypervisors the ability to more accurately measure memory utilization for purposes of implementing a TLB replacement policy to select TLB entries for eviction from a TLB or implementing a page replacement policy to select pages to be paged-out from physical memory using LRU (least recently used) or LFU (least frequently used) replacement schemes that are based, at least in part on, the translation count values of PTEs of pages.

FIG. 6 is a flow diagram of a method for managing memory using PTEs with translation counters, according to an embodiment of the invention. For purposes of illustration, the method of FIG. 6 will be discussed in the context of the virtual memory management system of FIG. 1. When an application requests access to data (or other content) in its virtual memory, the operating system (or hypervisor) will receive a virtual address from the application and process the virtual address to determine a page number referenced in the virtual address (block 600). For example, the CPU 120 will extract a VPFN and offset from the virtual address and provide the VPFN to the MMU 122. The MMU 122 will access the TLB 124 (i.e., perform a TLB lookup process) to determine if a PTE exists in the TLB for the given VPFN referenced in the virtual address (block 602). For example, the MMU 122 can use the given VPFN as a key to search the cached entries in the TLB to determine if a corresponding PTE is present in the TLB for the given VPFN.

If it is determined that the PTE for the referenced page is present in the TLB, i.e., a TLB "hit" (affirmative decision in block 604), the MMU 122 will increment the translation counter of the PTE in the TLB for the given page, i.e., increase the translation count by one (block 606), and then generate a physical address using the offset (extracted from the virtual address) and the PFN in the TLB which is mapped to the given VPFN (block 608). On the other hand, if it is determined from the TLB lookup process that the PTE for the given page is not present in the TLB, i.e., a TLB "miss" (negative determination in block 604), the MMU 122 will access a page table associated with the given process to determine if a valid PTE exists in the page table for the given page (block 610) using a process known as a "page table walk."

If a PTE for the given page referenced by the virtual address can be found in the page table, and the PTE has a flag that is set to "present" or "valid," the MMU 122 will conclude that the given page exists in system memory (affirmative determination in page 612). The MMU 122 will then update the TLB with the PTE for the given page (block 614), and the process flow returns to block 602 wherein the faulting instruction is restarted. In this instance, since the PTE for the given page has been written to the TLB, the subsequent TLB lookup (blocks 602 and 603) will result in a TLB "hit" (affirmative determination in block 604), and the process flow will proceed to blocks 606 and 608 to increment the translation counter for the newly loaded PTE, generate the physical address which is associated with the virtual address, and then access the memory location in system memory which corresponds to the physical address.

In the process of block 614, there may be a circumstance in which the TLB is full (all TLB entries are utilized) wherein an existing TLB entry needs to be evicted to make room for the new PTE entry to be written to the TLB. With this process, a TLB entry can be selected for eviction using a TLB replacement policy such as a LRU (least recently used) or LFU (least frequently used) replacement policy, which is based, at least in part on, the translation count values of PTEs in the TLB. For example, a PTE entry in the TLB having the lowest translation count value can be considered a candidate for eviction. Furthermore, the translation count value of a given PTE in the TLB can be considered in conjunction with the value of the "present bit" or "dirty" bit, wherein a PTE entry in the TLB which is deemed not present or dirty can be evicted from the TLB.

Returning again to block 612, if a PTE for the given page referenced by the virtual address can be found in the page table, but that the PTE has a flag that is set to "not present" or "invalid," the MMU 122 will conclude that the given page does not exist in system memory and a page fault exception is generated (negative determination in page 612). A page table lookup fault may occur for various reasons. For example, the virtual address provided by the application may be invalid such that there is no translation available for the virtual address. This type of fault can occur because of a programming error, and the operating system is configured to process this fault using known techniques. Further, a page table lookup fault will occur if the virtual address is valid, but the requested data page does not actually reside in the system memory. This type of page fault will occur if, for example, the requested page has been "paged out" of physical memory to a secondary storage to make room for another page. The secondary store (or backing store) is typically referred to as a "swap partition," a "swap file," or a "page file." In addition, this fault can occur in demand paging schemes in which the VAS is memory-mapped to pages of a secondary storage (e.g., hard disk) but where the requested page has not yet been loaded into system memory. When this type of fault occurs (virtual address valid but page not in system memory), the referenced page will be accessed and loaded into system memory using a process flow as will be described now with reference to blocks 616 through 624.

The operating system (or hypervisor) will generate a memory access request to access the given page from secondary storage (block 616). For example, in FIG. 1, the storage controller 150 will receive and process the memory access request, and transfer a copy of the give pages from the secondary storage 160 to the operating system for storage in the system memory 140 (block 618). If the system memory is not full (negative determination in block 620), the operating system will store the accessed page into system memory and then update the page table and TLB with the PTE for the accessed page (block 622). The process flow returns to block 602 wherein the faulting instruction is restarted. In this instance, since the PTE for the given page has been written to the TLB, and the page has been stored in system memory, the subsequent TLB lookup (blocks 602 and 603) will result in a TLB "hit" (affirmative determination in block 604).

On the other hand, when the system memory is full (affirmative determination in block 620), one or more pages in the system memory will be paged out to a secondary storage to make room for the accessed page (block 624). The page table will be updated to indicate that (i) the paged-out memory page(s) (which previously resided in the system memory) no longer exist in the system memory, and that (ii) the page accessed from the secondary storage is now present in the system memory, and the TLB is updated to remove the entries associated with the paged-out pages (block 622). The process flow then returns to block 602 wherein the faulting instruction is restarted. In this instance, since the PTE for the given page has been written to the TLB, and the page has been stored in system memory, the subsequent TLB lookup (blocks 602 and 603) will result in a TLB "hit" (affirmative determination in block 604).

Any suitable page replacement scheme can be implemented (in block 624) to make room for the accessed page. For example, a PTE in the page table can be selected for eviction using a page replacement policy such as a LRU (least recently used) or LFU (least frequently used) replacement policy, which is based, at least in part on, the translation count values of PTEs in the page table. For example, a PTE entry for a given page in the page table having the lowest translation count value can be considered a candidate for eviction from the system memory.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for managing memory, comprising:
   receiving a virtual address from an executing process, wherein the virtual address references a virtual page frame number (VPFN) in a virtual address space associated with the executing process;
   accessing a page table entry (PTE) for translating the VPFN to a page frame number (PFN) of a memory page in a physical memory;
   incrementing a count value of a n-bit translation counter within the accessed PTE in response to the translating, wherein the count value of the n-bit translation counter indicates a number of times that said PTE has been accessed to translate the VPFN to the PFN of the memory page in the physical memory;
   accessing a memory location within the PFN of the memory page in the physical memory, which corresponds to the virtual address;
   tracking a number of resets of the n-bit translation counter within said PTE as a result of overflow conditions of the n-bit translation counter during a given period of time;
   determining a current count value of the n-bit translation counter within said PTE for the given period of time;
   determining a frequency at which the executing process is accessing the memory page associated with the VPFN during the given period of time based on the current count value of the n-bit translation counter within said PTE and the tracked number of resets of the n-bit translation counter within said PTE, wherein the frequency comprises a rate at which the memory page is accessed during the given period of time; and
   utilizing the determined frequency to track memory usage of the memory page associated with the VPFN.

2. The method of claim 1, wherein the n-bit translation counter is implemented using reserved bits within a data structure of the PTE.

3. The method of claim 1, wherein accessing the PTE comprises accessing the PTE in a translation lookaside buffer (TLB), and wherein the n-bit translation counter is incremented within the PTE in the TLB.

4. The method of claim 3, wherein accessing the PTE in the TLB and incrementing the n-bit translation counter within the accessed PTE is performed by a hardware memory management unit.

5. The method of claim 3, further comprising:
   disabling the n-bit translation counter within the PTE in the TLB when the n-bit translation counter overflows; and
   enabling the n-bit translation counter within the PTE, when an operating system or hypervisor resets the n-bit translation counter within a corresponding PTE in a page table.

6. The method of claim 1, further comprising utilizing a count value of the n-bit translation counter within the PTE as part of a TLB replacement policy to determine if the PTE is a candidate for eviction from the TLB.

7. The method of claim 1, further comprising utilizing a count value of the n-bit translation counter within the PTE as part of a page replacement policy to determine if a page which corresponds to the PTE is a candidate to be paged-out from the physical memory.

8. The method of claim 1, further comprising utilizing the tracked memory usage for the memory page associated with the VPFN to determine which level of memory in a tiered memory framework comprising multiple tier levels of physical memory, to store the memory page.

9. An article of manufacture comprising a processor-readable storage medium having stored therein program code of one or more software programs, wherein the program code is executable by a processor to perform method steps comprising:
    receiving a virtual address from an executing process, wherein the virtual address references a virtual page frame number (VPFN) in a virtual address space associated with the executing process;
    accessing a page table entry (PTE) for translating the VPFN to a page frame number (PFN) of a memory page in a physical memory;
    incrementing a count value of a n-bit translation counter within the accessed PTE in response to the translating, wherein the count value of the n-bit translation counter indicates a number of times that said PTE has been accessed to translate the VPFN to the PFN of the memory page in the physical memory;
    accessing a memory location within the PFN of the memory page in the physical memory, which corresponds to the virtual address;
    tracking a number of resets of the n-bit translation counter within said PTE as a result of overflow conditions of the n-bit translation counter during a given period of time;
    determining a current count value of the n-bit translation counter within said PTE for the given period of time;
    determining a frequency at which the executing process is accessing the memory page associated with the VPFN during the given period of time based on the current count value of the n-bit translation counter within said PTE and the tracked number of resets of the n-bit translation counter within said PTE, wherein the frequency comprises a rate at which the memory page is accessed during the given period of time; and
    utilizing the determined frequency to track memory usage of the memory page associated with the VPFN.

10. The article of manufacture of claim 9, wherein the n-bit translation counter is implemented using reserved bits within a data structure of the PTE.

11. The article of manufacture of claim 9, wherein accessing the PTE comprises accessing the PTE in a translation lookaside buffer (TLB), and wherein the n-bit translation counter is incremented within the PTE in the TLB.

12. The article of manufacture of claim 11, wherein the program code is executable by the processor to perform method steps comprising:
    disabling the n-bit translation counter within the PTE in the TLB when the n-bit translation counter overflows; and
    enabling the n-bit translation counter within the PTE, when an operating system or hypervisor resets the n-bit translation counter within a corresponding PTE in a page table.

13. The article of manufacture of claim 9, wherein program code is executable by the processor to perform a process which comprises utilizing a count value of the n-bit translation counter within the PTE as part of a TLB replacement policy to determine if the PTE is a candidate for eviction from the TLB.

14. The article of manufacture of claim 9, wherein the program code is executable by the processor to perform a process which comprises utilizing a count value of the n-bit translation counter within the PTE as part of a page replacement policy to determine if a page which corresponds to the PTE is a candidate to be paged-out from the physical memory.

15. The article of manufacture of claim 9, wherein the program code is executable by the processor to perform a process which comprises utilizing the tracked memory usage for the memory page associated with the VPFN to determine which level of memory in a tiered memory framework comprising multiple tier levels of physical memory, to store the memory page.

16. An apparatus, comprising:
    a processor; and
    a physical memory to store program instructions that are executed by the processor to perform a method comprising:
    receiving a virtual address from an executing process, wherein the virtual address references a virtual page frame number (VPFN) in a virtual address space associated with the executing process;
    accessing a page table entry (PTE) for translating the VPFN to a page frame number (PFN) of a memory page in a physical memory;
    incrementing a count value of a n-bit translation counter within the accessed PTE in response to the translating, wherein the count value of the n-bit translation counter indicates a number of times that said PTE has been accessed to translate the VPFN to the PFN of the memory page in the physical memory;
    accessing a memory location within the PFN of the memory page in the physical memory, which corresponds to the virtual address;
    tracking a number of resets of the n-bit translation counter within said PTE as a result of overflow conditions of the n-bit translation counter during a given period of time;
    determining a current count value of the n-bit translation counter within said PTE for the given period of time;
    determining a frequency at which the executing process is accessing the memory page associated with the VPFN during the given period of time based on the current count value of the n-bit translation counter within said PTE and the tracked number of resets of the n-bit translation counter within said PTE, wherein the frequency comprises a rate at which the memory page is accessed during the given period of time; and
    utilizing the determined frequency to track memory usage of the memory page associated with the VPFN.

17. The apparatus of claim 16, wherein the n-bit translation counter is implemented using reserved bits within a data structure of the PTE.

18. The apparatus of claim 16, wherein the PTE is accessed in a translation lookaside buffer (TLB), and wherein the n-bit translation counter is incremented within the PTE in the TLB.

19. The apparatus of claim 18, wherein the n-bit translation counter within the PTE in the TLB is disabled when the n-bit translation counter overflows, and wherein the n-bit translation counter within the PTE is enabled when an operating system or hypervisor resets the n-bit translation counter within a corresponding PTE in a page table.

20. The apparatus of claim 16, wherein a count value of the n-bit translation counter within the PTE it utilized (i) as part of a TLB replacement policy to determine if the PTE is a candidate for eviction from the TLB and (ii) as part of a page replacement policy to determine if a page which corresponds to the PTE is a candidate to be paged-out from the physical memory.

* * * * *